United States Patent
Bui et al.

(10) Patent No.: US 9,263,065 B2
(45) Date of Patent: *Feb. 16, 2016

(54) VARIABLE STOPWRITE THRESHOLD WITH VARIABLE SMOOTHING FACTOR

(71) Applicant: International Business Machines Corporation, Armonk, NY (US)

(72) Inventors: Nhan X. Bui, Tucson, AZ (US); Kevin B. Judd, Tucson, AZ (US); Tomoko Taketomi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,851

(22) Filed: Dec. 8, 2014

(65) Prior Publication Data

US 2015/0092293 A1 Apr. 2, 2015

Related U.S. Application Data

(60) Continuation of application No. 14/228,167, filed on Mar. 27, 2014, now Pat. No. 8,937,777, which is a division of application No. 13/554,966, filed on Jul. 20, 2012, now Pat. No. 8,743,492.

(51) Int. Cl.
| | |
|---|---|
| *G11B 27/36* | (2006.01) |
| *G11B 20/10* | (2006.01) |
| *G11B 5/008* | (2006.01) |
| *G11B 5/09* | (2006.01) |
| *G11B 5/584* | (2006.01) |

(52) U.S. Cl.
CPC .......... *G11B 5/00817* (2013.01); *G11B 5/0083* (2013.01); *G11B 5/09* (2013.01); *G11B 5/584* (2013.01); *G11B 20/10388* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 5,828,514 | A | 10/1998 | Chliwnyj et al. |
| 5,930,068 | A | 7/1999 | Gregg et al. |
| 6,064,535 | A | 5/2000 | Wilson et al. |
| 6,313,964 | B1 | 11/2001 | Lamberts et al. |
| 6,327,112 | B1 | 12/2001 | Ide et al. |
| 6,587,303 | B1 | 7/2003 | Bui et al. |

(Continued)

FOREIGN PATENT DOCUMENTS

| | | |
|---|---|---|
| CN | 1366672 A | 8/2002 |
| DE | 10123069 A1 | 3/2002 |

(Continued)

OTHER PUBLICATIONS

RD 455104, Mar. 10, 2002, International Business Machines Corp.

(Continued)

*Primary Examiner* — Peter Vincent Agustin
(74) *Attorney, Agent, or Firm* — Zilka-Kotab, PC

(57) ABSTRACT

In one embodiment, a method includes determining a stopwrite threshold based on a standard deviation or a variance at a current position error signal sample, and determining whether the current position error signal sample exceeds the stopwrite threshold. Writing is disabled in response to determining that the current position error signal sample exceeds the stopwrite threshold. Writing is enabled in response to determining that the current position error signal sample does not exceed the stopwrite threshold.

20 Claims, 9 Drawing Sheets

(56) References Cited

U.S. PATENT DOCUMENTS

| | | | |
|---|---|---|---|
| 6,714,371 | B1 | 3/2004 | Codilian |
| 6,717,759 | B1 | 4/2004 | Himle et al. |
| 6,882,489 | B1 | 4/2005 | Brunnett et al. |
| 6,950,269 | B1 | 9/2005 | Johnson |
| 7,154,690 | B1 | 12/2006 | Brunnett et al. |
| 7,525,753 | B1 | 4/2009 | DeRosa |
| 7,545,593 | B1 | 6/2009 | Sun et al. |
| RE40,822 | E | 7/2009 | Lai |
| 7,760,455 | B2 | 7/2010 | Kang et al. |
| 8,743,491 | B2 | 6/2014 | Judd |
| 8,743,492 | B2* | 6/2014 | Bui et al. ............... 360/31 |
| 8,804,257 | B2* | 8/2014 | Inch et al. ............... 360/31 |
| 8,810,939 | B2* | 8/2014 | Inch et al. ............... 360/31 |
| 8,902,531 | B2* | 12/2014 | Bui et al. ............... 360/55 |
| 8,937,777 | B2* | 1/2015 | Bui et al. ............... 360/31 |
| 9,042,046 | B2 | 5/2015 | Inch et al. |
| 9,070,407 | B2 | 6/2015 | Judd |
| 2002/0027729 | A1 | 3/2002 | Siew et al. |
| 2003/0002200 | A1 | 1/2003 | Shishida et al. |
| 2004/0125495 | A1 | 7/2004 | Schmidt |
| 2005/0052775 | A1 | 3/2005 | He et al. |
| 2005/0152058 | A1 | 7/2005 | Schmidt |
| 2005/0219737 | A1 | 10/2005 | Fukushima et al. |
| 2006/0077800 | A1 | 4/2006 | Hsieh et al. |
| 2006/0120230 | A1 | 6/2006 | Chen et al. |
| 2007/0014042 | A1 | 1/2007 | Nylander-Hill et al. |
| 2007/0041113 | A1 | 2/2007 | Mojica |
| 2007/0253096 | A1 | 11/2007 | Alfred et al. |
| 2008/0259488 | A1 | 10/2008 | Kang et al. |
| 2009/0128945 | A1 | 5/2009 | Ding et al. |
| 2010/0202078 | A1 | 8/2010 | Sato |
| 2011/0222183 | A1 | 9/2011 | Fry et al. |
| 2012/0038997 | A1 | 2/2012 | Jia |
| 2012/0307390 | A1 | 12/2012 | Bui et al. |
| 2012/0307392 | A1 | 12/2012 | Bui et al. |
| 2012/0307400 | A1 | 12/2012 | Kawabe |
| 2013/0063836 | A1 | 3/2013 | Bui et al. |
| 2013/0265670 | A1 | 10/2013 | Judd |
| 2014/0022666 | A1* | 1/2014 | Bui et al. ............... 360/75 |
| 2014/0063633 | A1* | 3/2014 | Inch et al. ............... 360/39 |
| 2014/0063635 | A1* | 3/2014 | Inch et al. ............... 360/60 |
| 2014/0211335 | A1* | 7/2014 | Bui et al. ............... 360/31 |
| 2014/0226228 | A1* | 8/2014 | Judd ............... 360/31 |
| 2014/0293470 | A1* | 10/2014 | Inch et al. ............... 360/31 |
| 2015/0262611 | A1 | 9/2015 | Judd |

FOREIGN PATENT DOCUMENTS

| | | |
|---|---|---|
| DE | 102013205074 A1 | 10/2013 |
| DE | 112012001729 T5 | 2/2014 |
| EP | 1211683 | 6/2002 |
| JP | 2006252631 | 9/2006 |
| JP | 2007213745 | 8/2007 |

OTHER PUBLICATIONS

Knuth, D. E., "The Art of Computer Programming, vol. 2: Seminumerical Algorithms," 2nd Edition, Addison-Wesley Publishing Company, 1981, pp. 232.

Panda et al., "Minimization of tape transient disturbances in track following tape drives with a disturbance observer," 13th Annual Symposium on Information Storage and Processing Systems, Jun. 17-18, 2002, pp. 11-16.

Jia, Q. W., "Write Fault Protection Against Shock Disturbance in Hard Disk Drives Without a Shock Sensor," IEEE Transactions on Magnetics, vol. 43, No. 9, Sep. 2007, pp. 3689-3693.

Welford, B.P., "Note on a Method for Calculating Corrected Sums of Squares and Products," Technometrics, vol. 4, No. 3, Aug. 1962, pp. 419-420 http://www.scribd.com/doc/75480425/6/The-Art-of-Computer-Programming.

"Algorithms for calculating variance," Wikipedia, last modified on Mar. 17, 2012, retrieved Mar. 30, 2012 http://en.wikipedia.org/wiki/Algorithms_for_calculating_variance#On-line_algorithm, pp. 1-11.

"Truncated normal distribution," Wikipedia, last modified on Mar. 21, 2012, retrieved Mar. 30, 2012 http://en.wikipedia.org/wiki/Truncated_normal_distribution, pp. 1-4.

International Search Report from PCT Application No. PCT/CA13/50484, dated Aug. 30, 2013.

Written Opinion from PCT Application No. PCT/CA13/50484, dated Sep. 24, 2013.

Corrected Notice of Allowability from U.S. Appl. No. 13/597,138, dated May 29, 2014.

Ex Parte Quayle Action from U.S. Appl. No. 14/256,177, dated Dec. 4, 2014.

Final Office Action from U.S. Appl. No. 13/597,138, dated Feb. 27, 2014.

Final Office Action from U.S. Appl. No. 14/307,350, dated Nov. 18, 2014.

Non-Final Office Action from U.S. Appl. No. 13/440,904, dated Nov. 4, 2013.

Non-Final Office Action from U.S. Appl. No. 13/597,138, dated Nov. 7, 2013.

Non-Final Office Action from U.S. Appl. No. 14/307,350, dated Jul. 24, 2014.

Notice of Allowance from U.S. Appl. No. 13/440,904, dated Jan. 21, 2014.

Notice of Allowance from U.S. Appl. No. 13/554,966, dated Jan. 17, 2014.

Notice of Allowance from U.S. Appl. No. 13/597,138, dated Apr. 9, 2014.

Notice of Allowance from U.S. Appl. No. 14/068,304, dated Dec. 19, 2013.

Notice of Allowance from U.S. Appl. No. 14/228,167, dated Sep. 11, 2014.

Restriction/Election Requirement from U.S. Appl. No. 13/440,904, dated Oct. 4, 2013.

Restriction/Election Requirement from U.S. Appl. No. 13/554,966, dated Dec. 6, 2013.

Supplemental Notice of Allowance from U.S. Appl. No. 14/068,304, dated Feb. 26, 2014.

Supplemental Notice of Allowance from U.S. Appl. No. 14/068,304, dated Mar. 14, 2014.

Supplemental Notice of Allowance from U.S. Appl. No. 14/228,167, dated Nov. 17, 2014.

U.S. Appl. No. 13/440,904, filed Apr. 5, 2012.
U.S. Appl. No. 13/554,966, filed Jul. 20, 2012.
U.S. Appl. No. 13/597,138, filed Aug. 28, 2012.
U.S. Appl. No. 14/068,304, filed Oct. 31, 2013.
U.S. Appl. No. 14/228,167, filed Mar. 27, 2014.
U.S. Appl. No. 14/256,177, filed Apr. 18, 2014.
U.S. Appl. No. 14/307,350, filed Jun. 17, 2014.

Notice of Allowance from U.S. Appl. No. 14/307,350, dated Jan. 22, 2015.

IBM, "A method to send status bytes of a write command with post PRS check," International Business Machines Corporation Research Disclosure 455104, Mar. 10, 2002, 1 page.

Supplemental Notice of Allowance from U.S. Appl. No. 14/256,117, dated May 14, 2015.

Judd K.B., U.S. Appl. No. 14/727,829, filed Jun. 1, 2015.

Office Action Summary from German Application No. 112013003138.8, dated Mar. 4, 2015.

Notice of Allowance from U.S. Appl. No. 14/256,117, dated Feb. 25, 2015.

Office Action Summary from Chinese Application No. 201310115926.0, dated Aug. 28, 2015.

Non-Final Office Action from U.S. Appl. No. 14/727,829, dated Nov. 5, 2015.

Office Action from German Application No. 102013205074.7, dated Novemeber 23, 2015.

* cited by examiner

VARIABLE STOPWRITE THRESHOLD WITH VARIABLE SMOOTHING FACTOR

RELATED APPLICATIONS

This application is a continuation of U.S. patent application Ser. No. 14/228,167, filed Mar. 27, 2014, which is a divisional of U.S. Pat. No. 8,743,492, issued Jun. 3, 2014, which are herein incorporated by reference.

BACKGROUND

The present invention relates to data storage systems, and more particularly, this invention relates to systems and methods for adjusting a stopwrite threshold based in part on a variable smoothing factor.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

Tape drives have conventionally used a servo system to keep the write/read heads in the correct lateral location on the tape. The difference between the correct location and actual location of the heads is referred to as position error signal (PES).

However, it is difficult to pick the appropriate SW threshold due to the differences in distributions of PES data for different drives and/or different tapes. Another drawback is that when a particular predetermined SW threshold is used, the drive may write the data without any apparent error, when actually the adjacent tracks have been overwritten, rendering the data therein unreadable. This result is highly undesirable.

Current servo systems implement a fixed threshold such that if the PES is larger than the threshold, the writing of the heads will be stopped to prevent overwriting of adjacent tracks. This threshold is referred to as the stopwrite (SW) threshold.

BRIEF SUMMARY

In one embodiment, a method includes determining a stopwrite threshold based on a standard deviation or a variance at a current position error signal sample, and determining whether the current position error signal sample exceeds the stopwrite threshold. Writing is disabled in response to determining that the current position error signal sample exceeds the stopwrite threshold. Writing is enabled in response to determining that the current position error signal sample does not exceed the stopwrite threshold.

In another embodiment, a system includes a controller, and logic encoded in and/or available to the controller. The logic is configured to determine a stopwrite threshold based on a standard deviation or a variance at a current position error signal sample, and determine whether the current position error signal sample exceeds the stopwrite threshold. Writing is disabled in response to determining that the current position error signal sample exceeds the stopwrite threshold. Writing is enabled in response to determining that the current position error signal sample does not exceed the stopwrite threshold.

In yet another embodiment, a computer program product includes a computer readable storage medium having program instructions embodied therewith. The computer readable program code are executable by a controller to cause the controller to perform the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1:
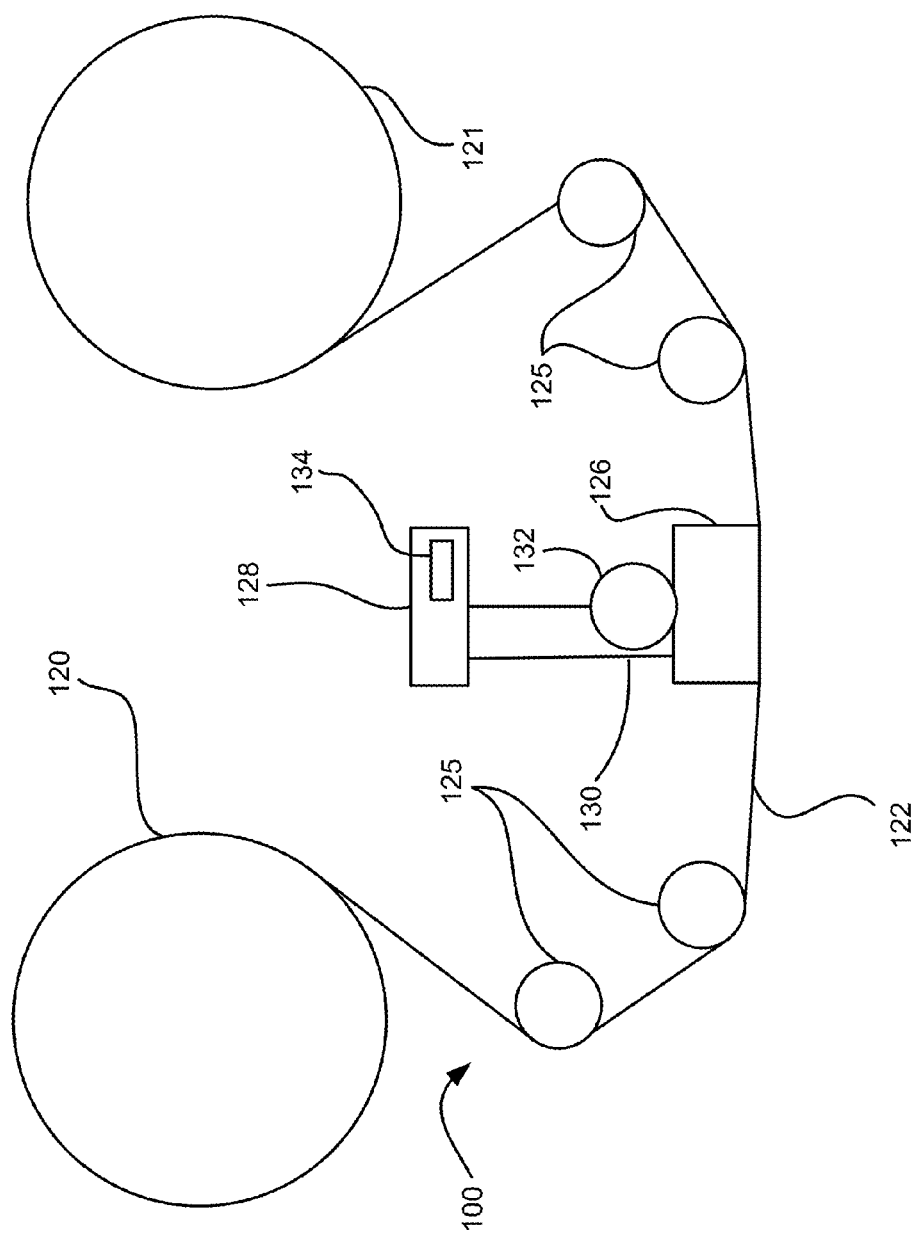
FIG. 1 is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems and/or related systems and methods.

In one general embodiment, a data storage system includes a head; a drive mechanism for passing a medium over the head; a controller electrically coupled to the head; logic encoded in or available to the controller for periodically determining a stopwrite threshold based on a standard deviation or a variance at a current position error signal sample, wherein a smoothing factor applied to a subsequent calculation of the standard deviation or variance is altered based at least in part on a current magnitude of the standard deviation or the variance; logic encoded in or available to the controller for determining whether the current position error signal sample exceeds the stopwrite threshold; logic encoded in or available to the controller for disabling writing when the current position error signal sample exceeds the stopwrite threshold; and logic encoded in or available to the controller for enabling writing when the current position error signal sample does not exceed the stopwrite threshold.

In another general embodiment, a method includes periodically determining a stopwrite threshold based on a standard deviation or a variance at a current position error signal sample, wherein a smoothing factor applied to a subsequent calculation of the standard deviation or variance is altered based at least in part on a current magnitude of the standard deviation or the variance; determining whether the current position error signal sample exceeds the stopwrite threshold; disabling writing when the current position error signal sample exceeds the stopwrite threshold; and enabling writing when the current position error signal sample does not exceed the stopwrite threshold.

In another general embodiment, a computer program product includes a computer readable storage medium having computer readable program code embodied therewith, the computer readable program code comprising: computer readable program code configured to update a standard deviation or a variance based on a current position error signal sample, wherein a smoothing factor applied to a subsequent calculation of the standard deviation or variance is dynamically altered based at least in part on whether a current value of the standard deviation or the variance is above or below a specified value; computer readable program code configured to determine whether the standard deviation or the variance exceeds a predetermined threshold; computer readable program code configured to determine a stopwrite threshold based on the standard deviation or the variance when the standard deviation or the variance exceeds the predetermined threshold; computer readable program code configured to determine whether the current position error signal sample exceeds the stopwrite threshold; computer readable program code configured to disable writing when the current position error signal sample exceeds the stopwrite threshold; and computer readable program code configured to enable writing when the current position error signal sample does not exceed the stopwrite threshold.

In yet another general embodiment, a data storage system includes a head; a drive mechanism for passing a medium over the head; a controller electrically coupled to the magnetic head; logic encoded in or available to the controller for updating a standard deviation or a variance based on a current position error signal sample, wherein a smoothing factor applied to a subsequent calculation of the standard deviation or variance is dynamically altered based at least in part on whether a current value of the standard deviation or the variance is above or below a specified value; logic encoded in or available to the controller for determining whether the standard deviation or the variance exceeds a predetermined threshold; logic encoded in or available to the controller for determining a stopwrite threshold based on the standard deviation or the variance when the standard deviation or the variance exceeds the predetermined threshold; logic encoded in or available to the controller for determining whether the current position error signal sample exceeds the stopwrite threshold; logic encoded in or available to the controller for disabling writing when the current position error signal sample exceeds the stopwrite threshold; and logic encoded in or available to the controller for enabling writing when the current position error signal sample does not exceed the stopwrite threshold.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
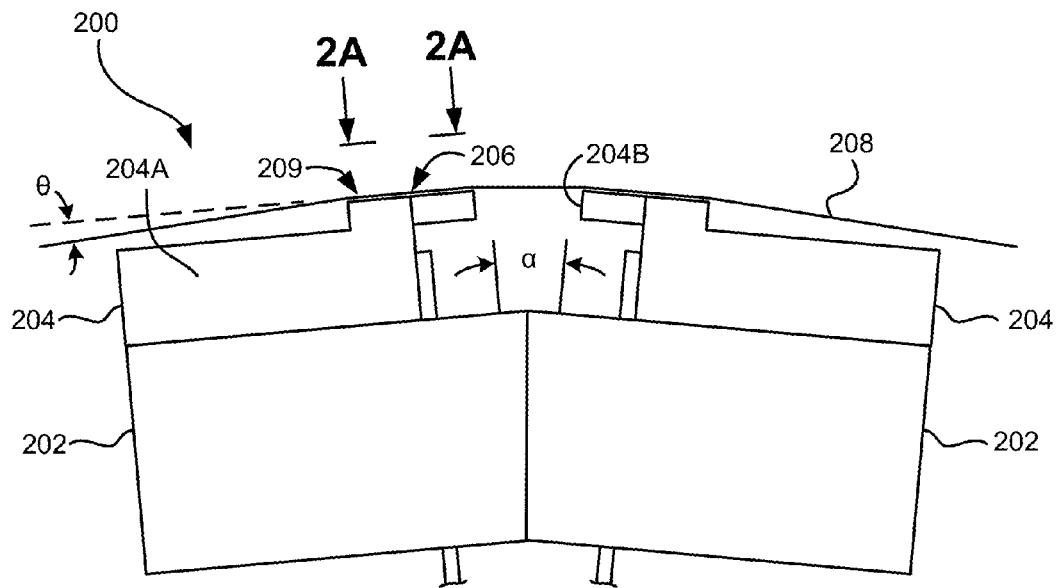
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
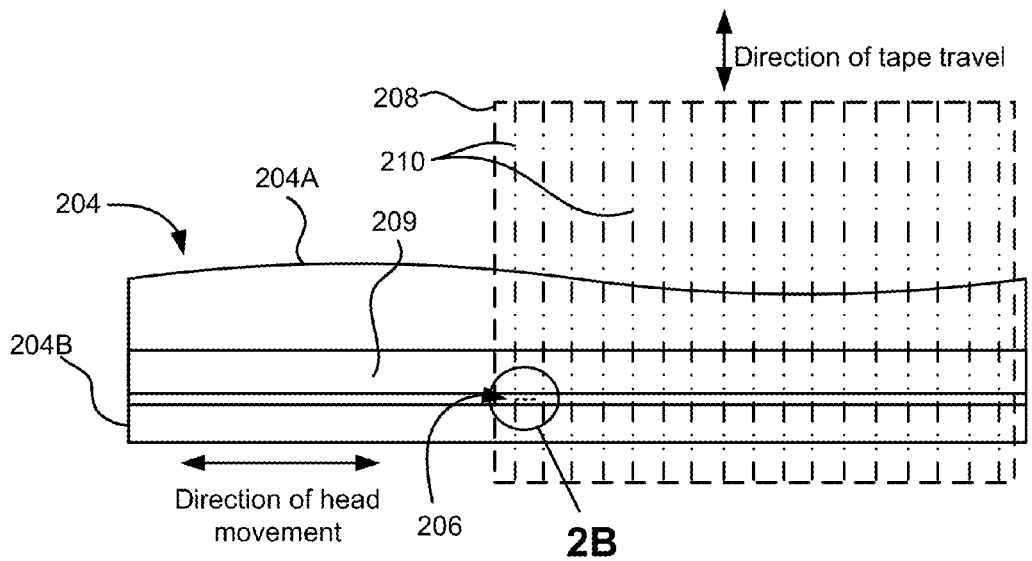
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 512 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
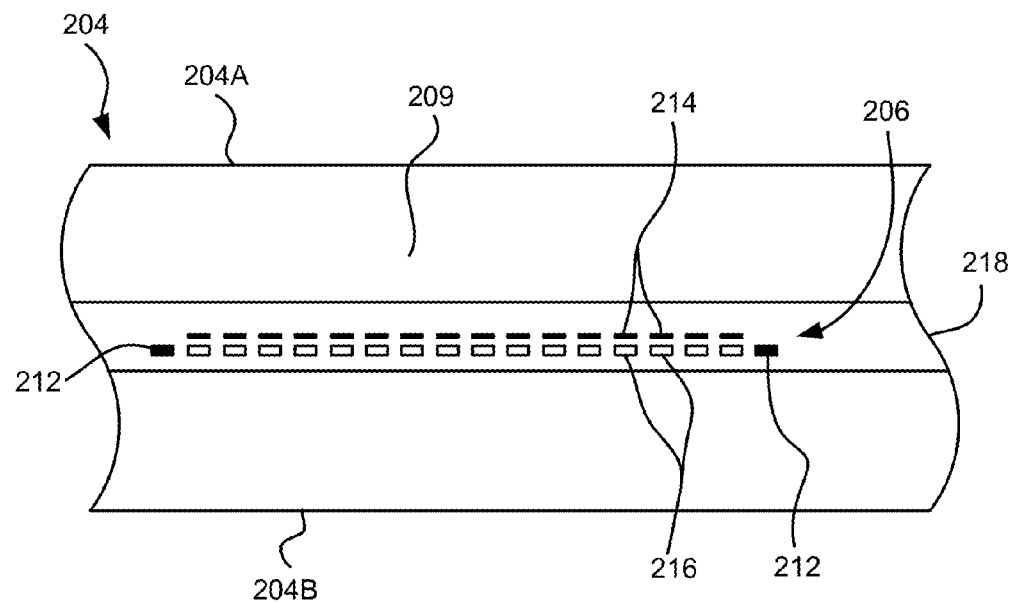
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
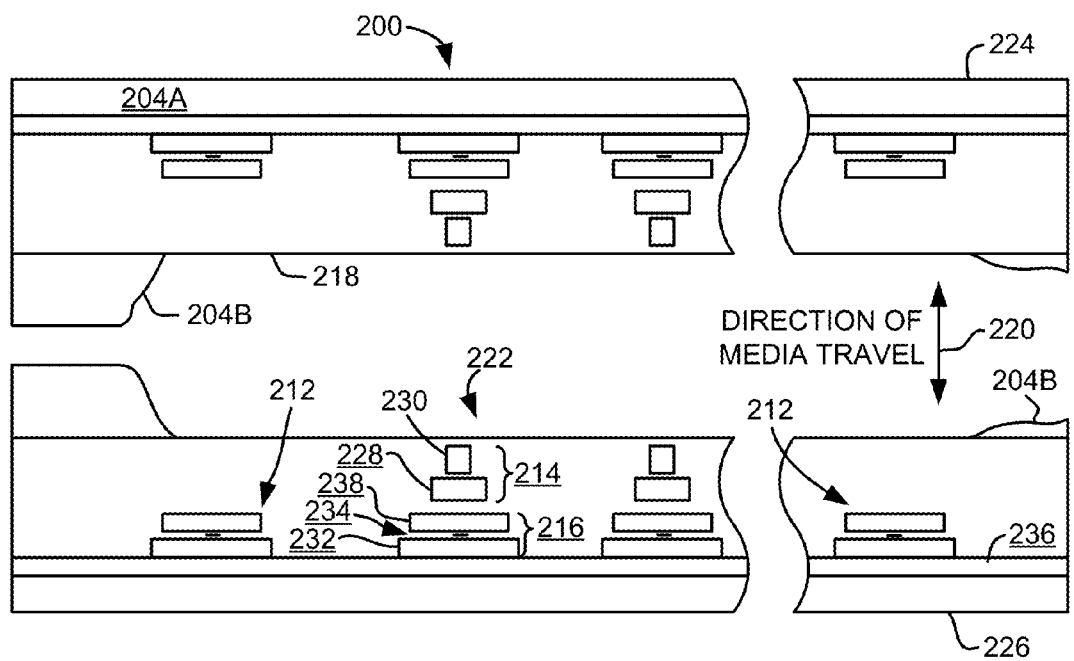
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3:
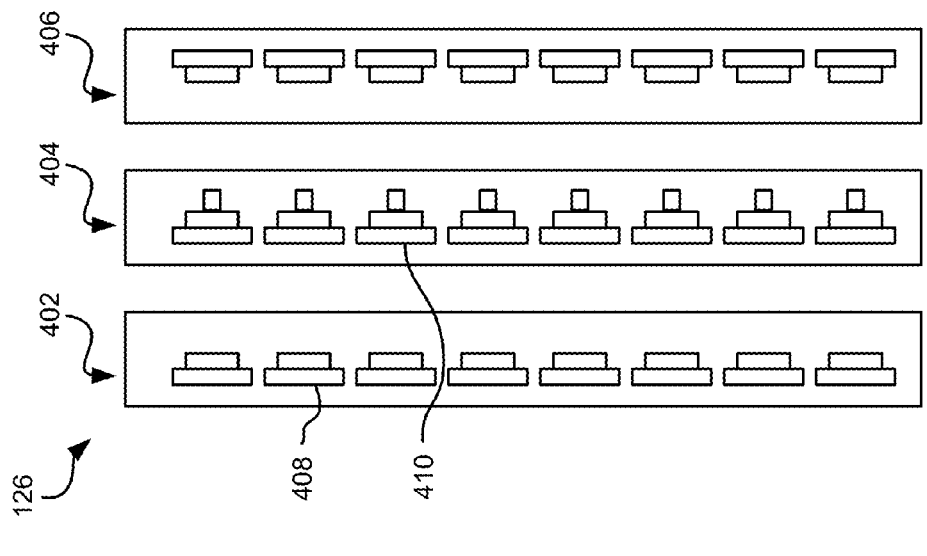
FIG. 3 is a partial tape bearing surface view of a magnetic head having a write-read-write configuration.
Figure 4:
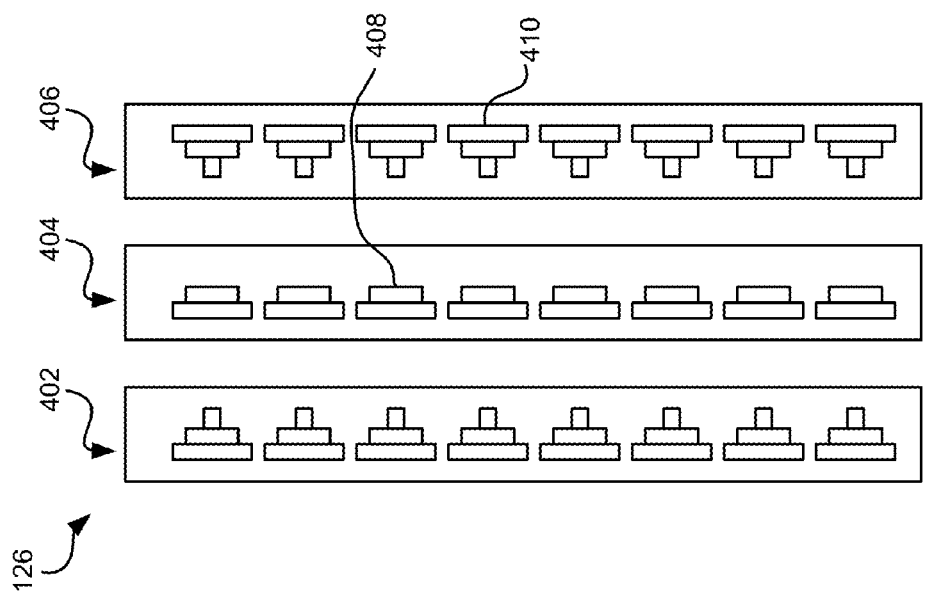
FIG. 4 is a partial tape bearing surface view of a magnetic head having a read-write-read configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 402, 406 each include one or more arrays of writers 410. The inner module 404 of FIG. 3 includes one or more arrays of readers 408 in a similar configuration. Variations of a multi-module head include a R-W-R R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

The teachings herein may be applied to other types of data storage systems. For example, according to a general embodiment, a data storage system may include a head which may be magnetic, optical, etc. or any other type of head which would be apparent to one skilled in the art upon reading the present description. The system may additionally include a drive mechanism for passing an e.g., magnetic, optical, etc. medium over the head. The data storage system may further include a controller electrically coupled to the head.

The data storage system may also include logic according to any of the embodiments described and/or suggested herein. In one approach, the logic may be encoded in a controller and/or other hardware, stored in memory as software or firmware and available to the controller and/or other hardware, etc. and combinations thereof. Moreover, the logic may be for performing any of the process steps recited herein.

Conventional data storage systems include a predefined stopwrite threshold and can be inaccurate for any given period of writing. Depending on the situation, the stopwrite threshold can either be overly constraining by only permitting writing during a low PES, thereby minimizing the capacity of the tape; or it may be overly permissive by permitting writing during high PES samples, thus allowing adjacent tracks on the medium to be overwritten.

Embodiments of the present invention overcome the aforementioned drawback by providing a stopwrite system that is able to adjust the stopwrite threshold to accommodate varying write conditions. Preferably, such system and/or method is able to statistically calculate the PES standard deviation (or other derivative of a PES sample) and make changes to the stopwrite threshold accordingly, as explained in further detail below. Moreover, each system and/or method may ensure the appropriate stopwrite threshold to accommodate favorable conditions such that written data may be read back later.

Figure 5:
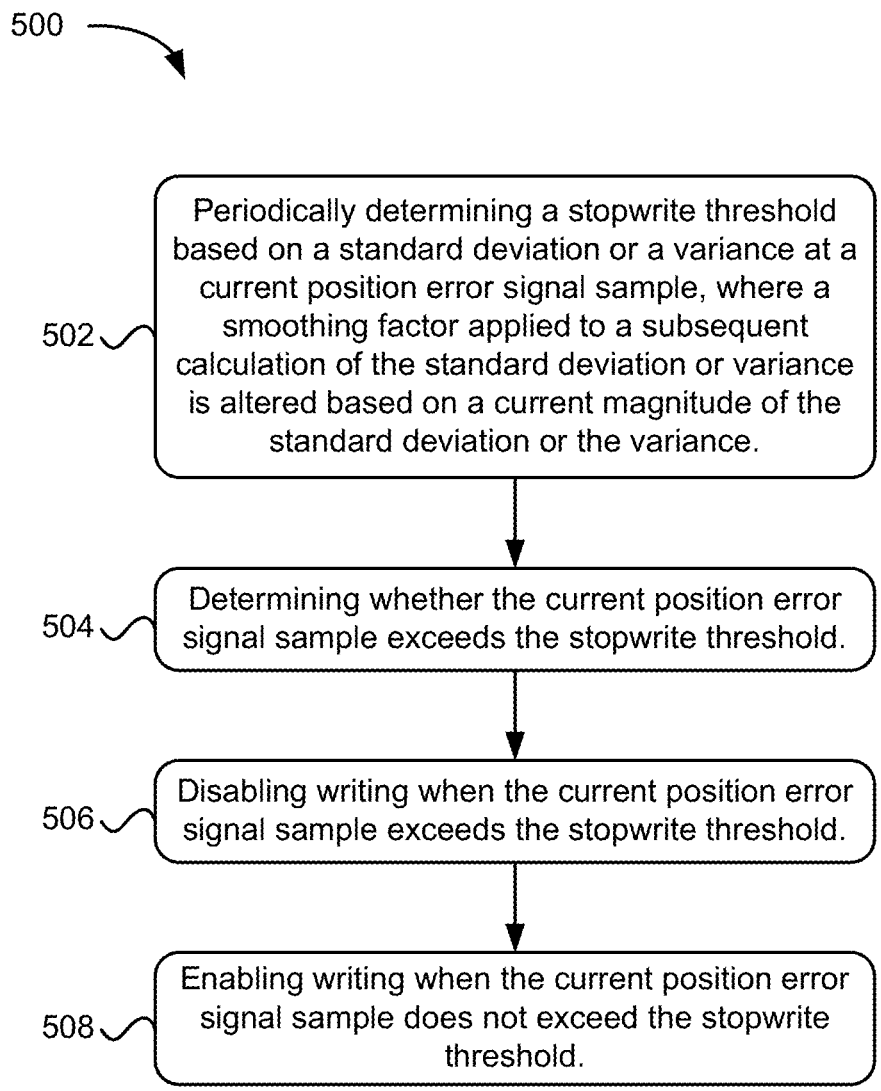
FIG. 5 depicts a method according to one embodiment.

Referring now to FIG. 5, a method 500 is depicted according to one embodiment. As an option, the present method 500 may be implemented in conjunction with features from any other embodiment listed herein, such as those described with reference to the other FIGS. Of course, however, such method 500 and others presented herein may be used in various applications and/or in permutations which may or may not be specifically described in the illustrative embodiments listed herein. Further, the method 500 presented herein may be used in any desired environment.

Referring to FIG. 5, a method 500 is depicted according to one illustrative embodiment of a simplified process for successfully recording data to a medium. The method 500 includes periodically determining a stopwrite threshold based on a standard deviation or a variance at a current position error signal sample. As discussed in more detail below, a smoothing factor applied to a subsequent calculation or calculations of the standard deviation (e.g., $\sigma_{raw}$) or variance (e.g., $\sigma_k^2$) is altered based, at least in part, on a current magnitude of the standard deviation (e.g., $\sigma_{raw}$) or the variance (e.g., $\sigma_k^2$). See operation 502. Alteration of the smoothing factor is explained in further detail below. It should be noted that the period may correspond to predetermined regular intervals; irregular intervals; periods calculated on the fly e.g., as a function of data rate, tape speed, etc.; etc.

With continued reference to FIG. 5, the method 500 also includes determining whether the current PES sample exceeds the stopwrite threshold. See operation 504.

In operation 506, writing is disabled when the current PES sample exceeds the stopwrite threshold.

The method 500 additionally includes enabling writing when the current PES sample does not exceed the stopwrite threshold. See operation 508.

According to various approaches the methods 500 and/or 600 (described below) may incorporate logic while conducting the aforementioned operations. In one approach, the logic may be encoded in a controller and/or other hardware, stored in memory as software or firmware and available to the controller and/or other hardware, etc. and combinations thereof.

In a preferred approach, the method 500 may be executed at intervals of less than about 1 second, more preferably less than about 0.01 seconds, still more preferably less than about 1 millisecond, but could be shorter or longer based on the desired embodiment. According to one illustrative embodiment which is by no means meant to limit the scope of the invention, the aforementioned logic may be executed at regular or irregular intervals of about 50 µs.

Figure 6:
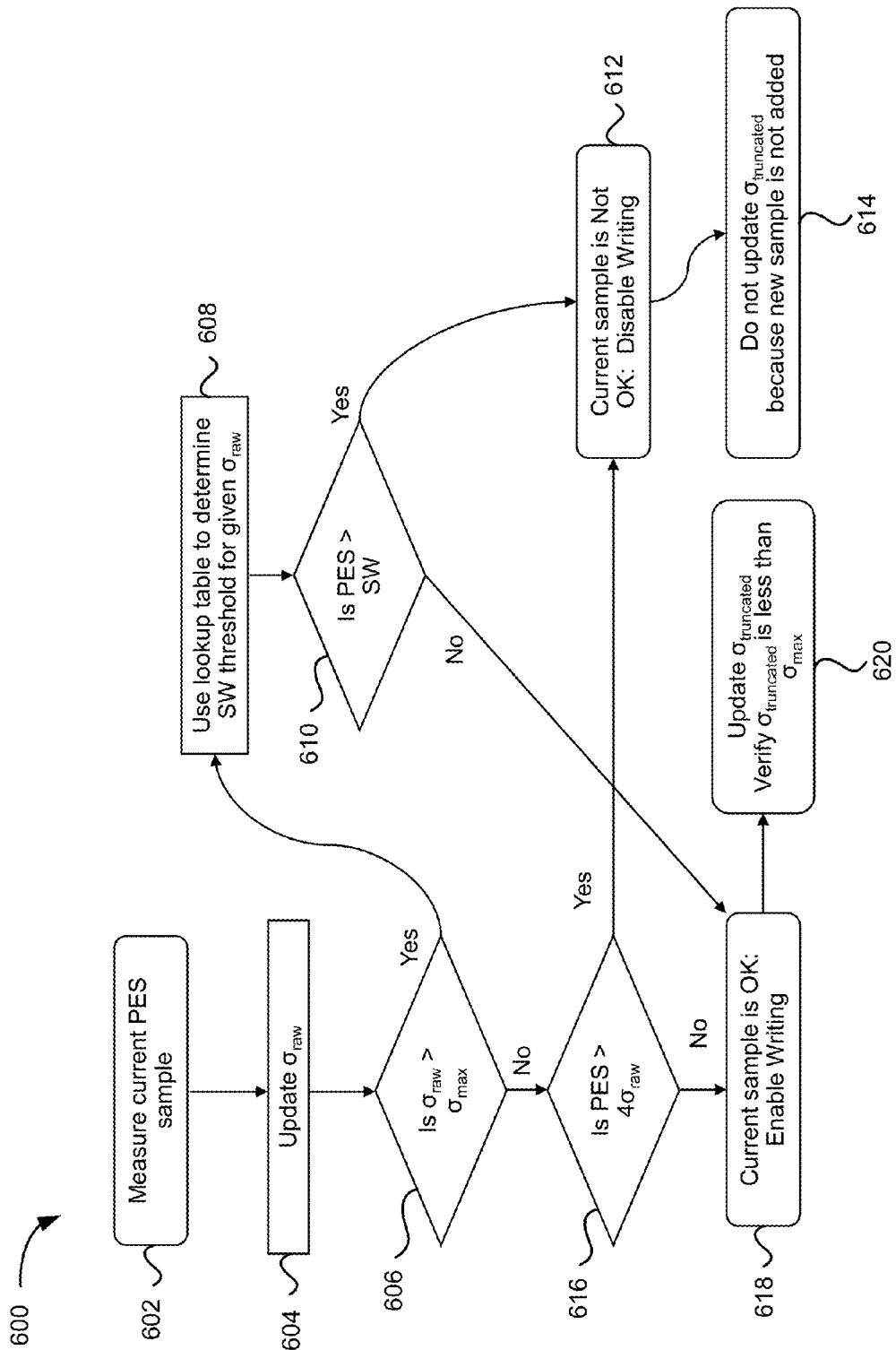
FIG. 6 is a flowchart of a method according to one embodiment.

Referring now to FIG. 6 a method 600 is depicted according to one illustrative embodiment. As an option, the present method 600 may be implemented in conjunction with features from any other embodiment listed herein, such as those described with reference to the other FIGS. Of course, however, such method 600 and others presented herein may be used in various applications and/or in permutations which may or may not be specifically described in the illustrative embodiments listed herein. Further, the method 600 presented herein may be used in any desired environment.

In a preferred approach, the method 600 may be executed at regular or irregular intervals as the track is being written to.

Operation 602 includes measuring the current PES sample. In one approach, the previous PES samples may be measured to find the corresponding deviation. According to one approach, the PES may be measured by incorporating any method known in the art, e.g., using servos, etc.

Operation 604 includes updating the standard deviation (e.g., $\sigma_{raw}$) or the variance (e.g., $\sigma_k^2$), based on PES samples, a current PES sample, etc. and the altered smoothing factor (B). See operation 502 of FIG. 5. According to various approaches, $\sigma_{raw}$ may be a standard deviation of PES samples, including prior PES samples, the current PES sample, etc. Moreover, $\sigma_{raw}$ may be calculated by incorporating any formula known in the art.

In a preferred illustrative embodiment, the standard deviation (e.g., $\sigma_{raw}$) or the variance (e.g., $\sigma_k^2$) may be calculated using Equation 1, where $\sigma_k$ is used as $\sigma_{raw}$.

$$\sigma_k^2 = B \times \sigma_{k-1}^2 + (1-B) \times x_k^2 \qquad \text{Equation 1}$$

According to the preferred embodiment, $\sigma_k^2$ represents the variance at the current PES sample, $\sigma_{k-1}^2$ represents the variance at the previous PES sample, and $x_k$ represents the current PES sample. By incorporating the variance of the previous PES samples, the accumulative distribution may be accurate, thereby preferably resulting in an accurate stopwrite threshold as well, without having to store all of the previous PES sample values. $\sigma_{raw}$ can be calculated by taking the square root of $\sigma_k^2$.

In one approach, if Equation 1 is incorporated for a first time, the value for $\sigma_{k-1}^2$ (variance of the previous PES sample) may implement stored data from the previous PES sample, an arbitrary value chosen by a user, etc. Without wishing to be bound by any theory, it is believed that the $\sigma_{k-1}^2$ value implemented for a first time Equation 1 is used, may not significantly affect the $\sigma_{raw}$ value that is calculated and used to set the SW threshold during writing.

As noted above, the standard deviation (e.g., $\sigma_{raw}$) or the variance (e.g., $\sigma_k^2$), in some approaches, is estimated with a smoothing factor, so that multiple PES samples are used to generate an accurate estimate of PES standard deviation. Depending on the embodiment, the value of the smoothing factor (B) may determine how much of an effect the previous PES sample has on the value of $\sigma_{raw}$ being calculated, relative to the current PES sample.

It is desired that the smoothing factor generate a reasonable slowly changing PES standard deviation estimate. In some embodiments, the calculation of the standard deviation (e.g., $\sigma_{raw}$) or the variance (e.g., $\sigma_k^2$) relies on a fixed smoothing factor. However, a fixed smoothing factor may be problematic. For example, if the PES standard deviation is over a specified limit, then a slowly changing standard deviation estimate can keep the stopwrite threshold low for too long. This results in unnecessary capacity loss.

For example, the drive may be exposed to different environments including normal tabletop operations, shock environments, high vibration environments, etc.; each of which having a different ideal smoothing factor. Moreover, drives may interact differently with different tapes. Use of a fixed smoothing factor in such environments may present disadvantages. According to an illustrative example, if a particular environment is suspected to be a high vibration environment (e.g., resulting in high PES), a fixed, small smoothing factor may be incorporated to quicken changes made to the standard deviation or the variance in the subsequent calculations thereof from the presently calculated value. Moreover, the small smoothing factor and resulting quick changes to the standard deviation or the variance may mirror the high PES values, and thereby cause a decreased stopwrite value. Preferably, a decreased stopwrite value may result in a high number of stopwrites to counteract the high PES. However, if the vibrations decrease (e.g., lower PES), the fixed, small smoothing factor may cause the stopwrite value to continue to rapidly change. Thus, although there may be a period of low PES, local high points may be misinterpreted as unfavorably high PES by the rapidly changing stopwrite value, thereby causing an unnecessary number of stopwrites during low vibration run time.

Similar unfavorable results may be experienced when a fixed, high smoothing factor is selected for operation in a low vibration environment, and the environment transitions to a high vibration environment. This may result in an undesirably slow change in the stopwrite value to counteract the high vibrations, such that multiple errors may be made while writing on the tape.

Therefore, in a preferred embodiment, the value of the smoothing factor may vary, depending on the value of the standard deviation (e.g., $\sigma_{raw}$) or the variance (e.g., $\sigma_k^2$).

According to one embodiment, the smoothing factor may switch between two values, depending on the standard deviation or the variance of the current position error signal in relation to a specified value. According to a preferred approach, the specified value may be $\sigma_{max}$ (described in further detail below).

In one approach, if the standard deviation or the variance of the current position error signal sample is below a specified value (e.g., $\sigma_{max}$ or a value selected using the same or similar techniques as selection of $\sigma_{max}$), the smoothing factor is altered to slow a change in the standard deviation or the variance in the subsequent calculations thereof from the presently calculated value. In Equation 1, above, the value of the smoothing factor would thus be increased. The low standard deviation or variance of the current position error signal sample signifies desirable and consistent writing conditions. Therefore, the altered smoothing factor may allow for a decreased number of stopwrites to maximize the write capacity of the tape.

However, according to another approach, if the standard deviation or the variance at the current position error signal sample is above a specified value (e.g., $\sigma_{max}$ or a value selected using the same or similar techniques as selection of $\sigma_{max}$), the smoothing factor value may be altered to accelerate a change in the standard deviation or the variance in the subsequent calculations thereof from the presently calculated value. As explained above, high standard deviation or variance (e.g., high PES) signifies unfavorable write conditions. Therefore, the thus altered smoothing factor may result in a favorably increased number of stopwrites to ensure minimal and/or no errors are made while writing to the tape, thereby improving the readability of the tape.

According to various other embodiments, the smoothing factor may switch between at least two values, at least three values, several values, etc. with respect to at least one specified value, at least two specified values, several specified values, etc. Thus, the smoothing factor may incorporate multiple discreet values which may be determined by any number of parameters, depending on the desired embodiment. According to different approaches, the smoothing factor may be determined by incorporating different parameters including, but not limited to, kurtosis; vibration levels, e.g., measured with an accelerometer in the drive; etc.

According to various other embodiments, the smoothing factor may vary according to a mathematical function. In one approach, the function may preferably allow the smoothing factor value to continuously vary, thereby increasing accuracy and/or efficiency when writing to the tape. According to one example, the smoothing factor may be altered after each calculation of the standard deviation or the variance during run time (explained in further detail below). However, according to other approaches, the smoothing factor may be altered after every second, third, fourth, fifth, etc. iteration of calculating the standard deviation or the variance during run time.

In another embodiment, the smoothing factor may gradually change as the standard deviation or the variance of the current position error signal sample approaches a specified value. For example, the smoothing factor may gradually change rather than jump abruptly when the specified limits are reached. This may preferably result in a more accurate response to external conditions, and ensure more efficient writing of data to the tape.

According to one approach, the value of the smoothing factor may be linearly interpolated between the specified high and low values thereof. In yet another approach, the smoothing factor may follow a nonlinear but prespecified curve between high and low values thereof.

Without wishing to be bound by any theory, it is believed that a value for smoothing factor B between about 0.95 and about 0.999 results in an optimal effect for most embodiments, but B may be any value. According to various embodiments, the value of the smoothing factor may be determined by the operating conditions, a predetermined value, selected from a lookup table, specified by a user, etc. Due to the highly adaptive nature of the embodiments described and/or suggested herein, in various approaches, the value of B may be outside the optimal range listed above, while maintaining desirable results. In yet another approach, B may be allowed to vary preferentially within the foregoing range, and allowed to exit the range when desirable for faster or slower change in the standard deviation or variance.

With continued reference to FIG. 6, operation 606 includes determining whether the standard deviation (e.g., $\sigma_{raw}$) or the variance (e.g., $\sigma_k^2$) exceeds a predetermined threshold (e.g., $\sigma_{max}$).

According to various approaches, a predetermined threshold (e.g., $\sigma_{max}$) may be calculated using any method known in the art; however an illustrative example, which is in no way meant to limit the invention, is provided.

Figure 7:
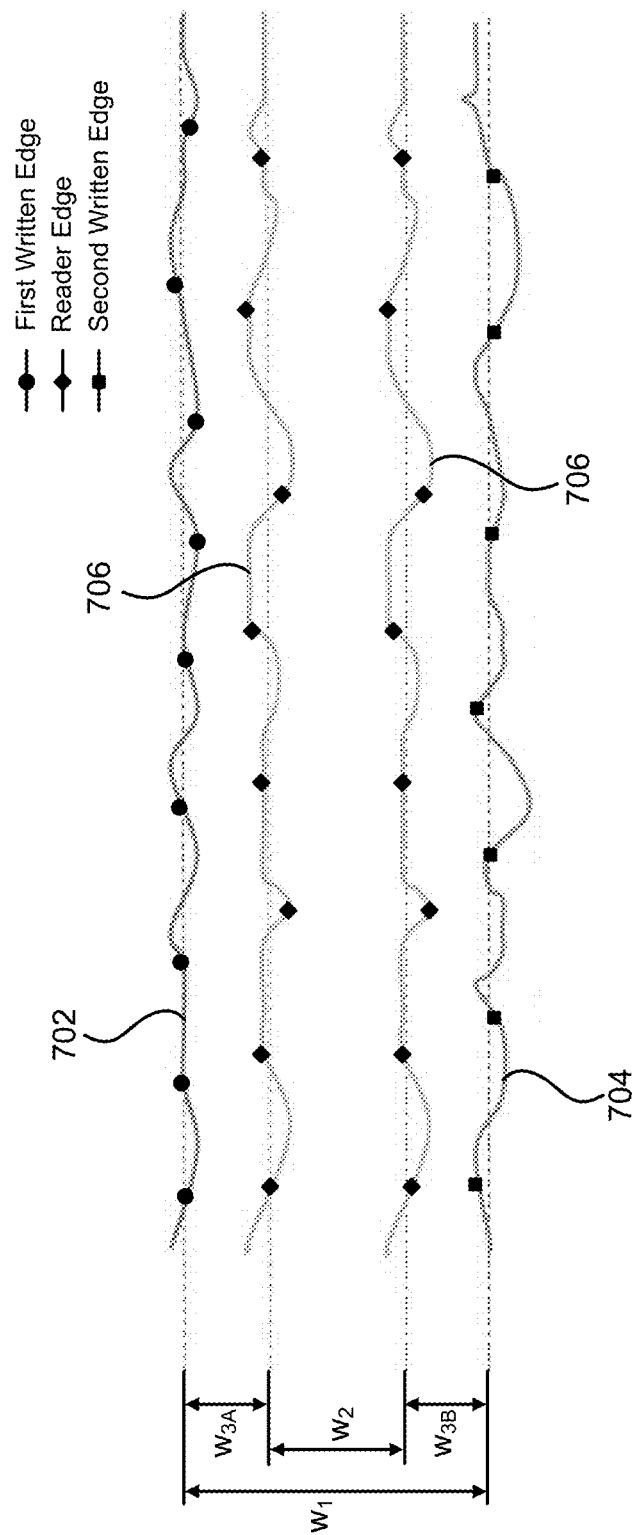
FIG. 7 is a top down view of a data track according to one embodiment.

In the following example, assume a data storage system includes a magnetic tape head writing data to shingled data tracks on the tape of the magnetic tape head as shown in FIG. 7.

Referring now to FIG. 7, the shingled track width $w_1$ defines the width of the first written track between the first written edge 702 and the second written edge 704. According to one approach, the second written edge 704 may be a first written edge of a second written track overlapping part of the first written track.

Moreover, the reader width $w_2$ defines the distance between the reader's outer edges 706, while the shingled reader guard bands $w_{3A}$ and $w_{3B}$ define the distance between the reader's outer edges 706 and the written edges 702 and 704 respectively. According to various approaches, the values of the shingled reader guard bands $w_{3A}$, $w_{3B}$ may be the same or different, depending on the position of the reader. The relative position of the reader with respect to a given written track may vary with time for a given magnetic tape head due to various factors (e.g., temperature, humidity, mechanical imperfections, movement of the reader, etc.).

According to one illustrative example, which is by no means meant to limit the scope of the invention, the shingled track width $w_1$ may be 4.75 μm (microns). Furthermore, the reader width $w_2$ may be 2.3 μm, while both the shingled reader guard bands $w_{3A}$ and $w_{3B}$ may be 1.23 μm (e.g., the reader is centered between the first and second written edges in a direction perpendicular thereto).

In some approaches, if too much of the reader is positioned over an adjacent written track rather than the track of interest, the reader may not be able to read the data written on the track of interest. It is preferred that a shingled reader guard band ensures that 100% of the reader width is within the first and second written edges of a given shingled track of interest. However, in one approach, a reader may be able to successfully read the data stored in a given written track of interest when approximately 10% of the reader width is outside the plane of the first and/or second written edges of the given written track of interest. Therefore, a shingled reader guard band may include 10% of the reader width as shown in Equation 2; but could be more or less depending on the desired embodiment.

$$\text{Shingled reader guard band} = 1.23 \, \mu m + 0.10(2.3 \, \mu m) \qquad \text{Equation 2}$$

Thus, with continued reference to the present illustrative example, the shingled reader guard bands may each be 1.46 μm.

Depending on the dimensions and/or conditions for a given magnetic tape head, a threshold deviation value (e.g., $\sigma_{max}$) may be calculated from the magnetic tape drive design. In a preferred approach, the threshold deviation value may incorporate an appropriate stopwrite to filter the data such that written data may be successfully read back later (explained in further detail below). The threshold deviation value may vary as to preferably accommodate any possible PES distribution. Thus, when analyzing a given data set of a given data storage system, the data may be evaluated as a distribution (e.g., a normal distribution). According to various approaches, the deviation value σ may incorporate, but is not limited to a factor "M" which may have a value of 1, 2, 3, 4.5, etc. or any other value which would be obvious to one skilled in the art upon reading the present description. In one illustrative example, the factor M may have a value of 3 such that the deviation value may be represented by 3σ ($3\sigma_{total}$) for a distribution of a given data set's PES. In one approach, the corresponding deviation value may be within the shingled reader guard band value calculated above, as shown in Equation 3.

$$3\sigma_{total} = 1.46 \, \mu m \qquad \text{Equation 3}$$

Once the equation is simplified and both sides are divided by 3, the resulting $\sigma_{total}$ value (e.g., standard deviation) is 0.49 μm.

However, the value $\sigma_{total}$ includes a combination of the deviations of both the written edge ($\sigma_w$) and the reader edge ($\sigma_r$) of the magnetic tape head. Equation 4 shows the relationship between $\sigma_{total}$ and the deviation values ($\sigma_w$ and $\sigma_r$) of the two signals combined to form $\sigma_{total}$.

$$\sigma_{total} = (\sigma_w^2 + \sigma_r^2)^{1/2} \qquad \text{Equation 4}$$

However, because the tape path and/or the actuator of the magnetic tape head may not able to distinguish the difference between when the head is reading and when the head is writing in some embodiments, $\sigma_w$ may be considered the same value as $\sigma_r$. Therefore, Equation 4 allows for either the maximum deviation of the written edge or the deviation of the reader edge to be calculated at any time. In one approach, the $\sigma_w$ value may be calculated by simplifying Equation 4 as is shown in Equation 5.

$$0.49 \, \mu m = (\sigma_w^2 + \sigma_w^2)^{1/2} \qquad \text{Equation 5}$$

Once simplified, Equation 5 results in the value for $\sigma_w$ as 0.35 μm. Therefore, according to the present illustrative example, a deviation of 0.35 μm may be incorporated in various embodiments as a threshold deviation value (e.g., $\sigma_{max}$), including any of the embodiments described and/or suggested herein.

As noted above, the standard deviation (e.g., $\sigma_{raw}$) or the variance (e.g., $\sigma_k^2$) is compared to the predetermined threshold (e.g., $\sigma_{max}$) in operation 606. With continued reference to FIG. 6, operation 608 includes determining a stopwrite threshold based on the standard deviation (e.g., $\sigma_{raw}$) or the variance (e.g., $\sigma_k^2$), when the standard deviation or the variance exceeds the predetermined threshold (e.g., $\sigma_{max}$).

Figure 8:
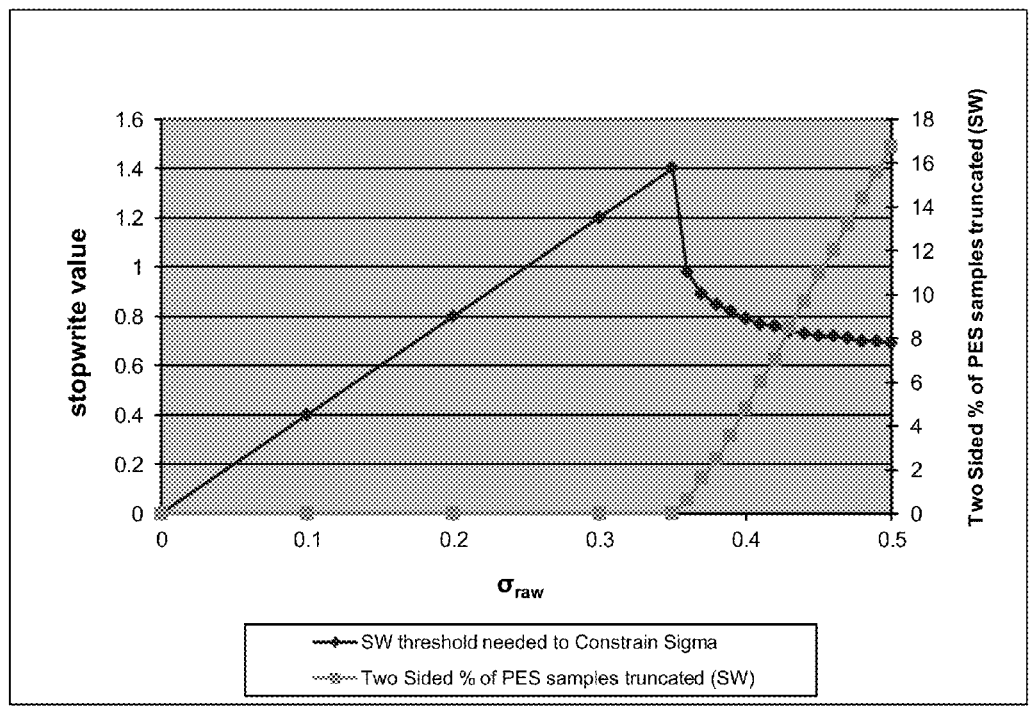
FIG. 8 is a graph according to one embodiment.

In one approach, the stopwrite threshold may be determined by selecting a stopwrite value preassociated with the standard deviation (e.g., $\sigma_{raw}$) or the variance (e.g., $\sigma_k^2$). In a preferred approach, the stopwrite value may be listed in a look up table (LUT) having stopwrite values calculated for various $\sigma_{raw}$ values, a plot as depicted in FIG. 8, etc. In another approach, the stopwrite values may be calculated in real-time and then implemented, as the current PES samples are measured.

Referring to FIG. 8, stopwrite values may be calculated for various possible $\sigma_{raw}$ values using a variance formula known in the art. These $\sigma_{raw}$ values (along the x-axis) and their corresponding stopwrite values (along the y-axis) may be stored in a plot as is shown in FIG. 8 for future use. As discussed above, the maximum desired $\sigma_{raw}$ value may preferably be 0.35 μm which corresponds to that which is depicted in the graph.

With continued reference to FIG. 6, operation 610 includes determining if the current PES sample exceeds the stopwrite threshold acquired in operation 608. In the case that the current PES sample in fact exceeds the stopwrite threshold, operation 612 of the method 600 disables writing.

In a preferred approach, if writing is enabled or disabled during an interval, it is enabled or disabled only for the current interval. It is preferred that, at the start of each new interval, the logic may be run to determine if the writing should be enabled or disabled for that given interval. In another approach, if writing is enabled or disabled during an interval, it may remain enabled or disabled for at least one, at least two intervals, multiple, etc. intervals, regardless of the logic.

With continued reference to FIG. 6, operation 614 includes not updating a truncated value (e.g., $\sigma_{truncated}$). According to a preferred approach, the truncated value is not updated when writing is disabled. More information about $\sigma_{truncated}$ is provided below, including operations when $\sigma_{truncated}$ is updated.

Referring back to operation 606, if it is determined that the standard deviation (e.g., $\sigma_{raw}$) or the variance (e.g., $\sigma_k^2$) does not exceed the predetermined threshold (e.g., $\sigma_{max}$), then the current PES sample is compared to a second value calculated using the standard deviation or the variance (e.g., four times $\sigma_{raw}$). See operation 616.

According to various approaches, the second value may be calculated by incorporating any formula, preferably one which includes $\sigma_{raw}$. In a preferred approach, the second value may act as a stopwrite threshold although the $\sigma_{raw}$ value does not exceed the value of $\sigma_{max}$. Therefore, rather than having no stopwrite threshold, the writing operation may be protected against any sudden fluctuations in the current PES sample, which could later cause readback errors. The second value itself can be any value providing the aforementioned result. According to one illustrative example, calculating a second value may include, but is not limited to $N \times \sigma_{raw}$, where N signifies a predetermined value such as 2, 3, 4, 5, etc.

With continued reference to FIG. 6, if it is determined that the current PES sample exceeds the second value (e.g., four times $\sigma_{raw}$), the method 600 precedes to operation 612 and 614 as described above.

However, if it is determined that the current PES sample does not exceed the second value (e.g., four times $\sigma_{raw}$), the method 600 proceeds to operation 618 which enables writing.

Similarly, referring back to operation 610, if the current PES sample is determined to not exceed the stopwrite threshold, then the method 600 proceeds to operation 618, thereby enabling writing as described above.

With continued reference to FIG. 6, once writing has been enabled in operation 618, the method 600 proceeds to update a truncated value (e.g., $\sigma_{truncated}$) and verify that the truncated value is less than $\sigma_{max}$. See operation 620.

According to a preferred approach, a method may include updating a truncated value (e.g., $\sigma_{truncated}$) by incorporating the current PES sample when writing is enabled. In one approach, the truncated value may be a standard deviation or variance of PES samples.

In some approaches, the truncated value may be compared to the predetermined threshold (e.g., $\sigma_{max}$). If the truncated value maintains a value at, or below the predetermined threshold, then it may be expected that, when reading back the written data on the track, no errors will occur.

According to one approach, if the $\sigma_{raw}$ is greater than the $\sigma_{max}$, then the method of truncated normal distributions (e.g., $\sigma_{truncated}$) may be incorporated to determine the truncation value such that the correct number of samples may be eliminated, but the PES values written to tape have the same standard distribution of $\sigma_{max}$. Thus, the $\sigma_{raw}$ of the data which may be written to the tape will preferably be less than the value $\sigma_{max}$. This may be accomplished by obtaining the correct truncation value from a formula, a look up table, a predetermined value, a chart, etc. For example, the SW Threshold line in FIG. 8 may be used. The foregoing feature is an important feature implemented in some embodiments because it guarantees that data will be written to tape with no more $\sigma$ than the $\sigma_{max}$, no matter how high the actual $\sigma$ really is. Although in some embodiments this design may sacrifice capacity by increasing stopwrite frequency, it will preferably ensure that no errors will occur during reading.

For example, if the $\sigma_{truncated}$ value for the data actually written to the aforementioned track remains less than $\sigma_{max}$, there should be no errors when reading back that same portion of the track. However, if the $\sigma_{truncated}$ value for the data being written to the aforementioned track rises above the $\sigma_{max}$ value, errors may be expected to occur when later reading the data written to that same segment of the track. According to one approach, such errors may be caused by not having enough of the intended data successfully written to the track; as suggested by the high deviation. Therefore, it may be desirable to perform some additional evaluations in the event that $\sigma_{truncated}$ is not less than $\sigma_{max}$.

Figure 9:
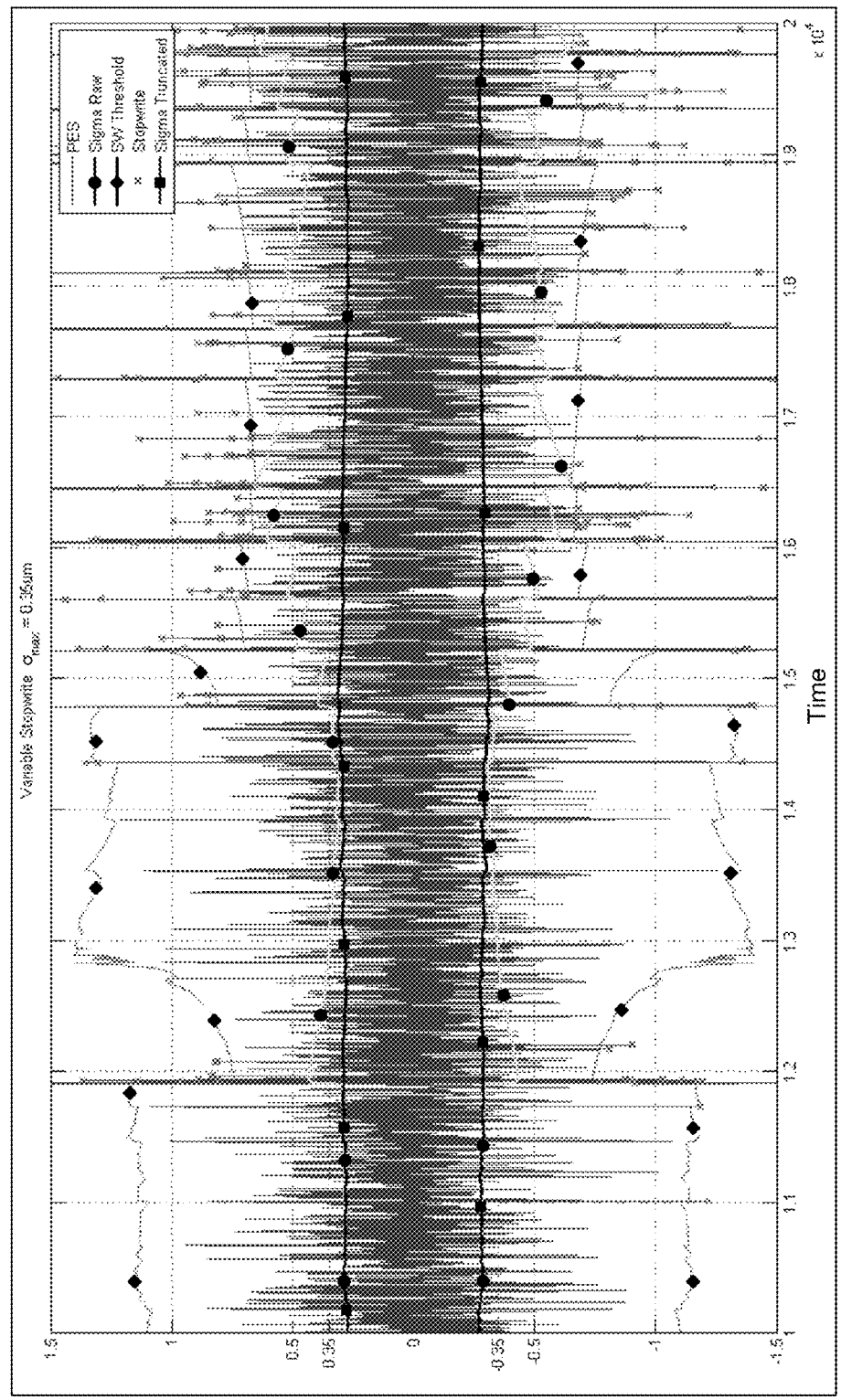
FIG. 9 is a graph according to one embodiment.

Referring now to FIG. 9, a graph displays results from implementation of one illustrative embodiment, which in no way is meant to limit the invention. The graph of FIG. 9 depicts the outcome of incorporating a method similar to and/or the same as that described in method 600, to a given set of data. As shown, the $\sigma_{raw}$ and stopwrite threshold (SW Threshold) values change as the PES is evaluated at predetermined intervals. Moreover, the $\sigma_{truncated}$ value remains at or below the $\sigma_{max}$ value of 0.35 μm for this illustrative example, thereby ensuring that the data being written will be able to be successfully read back.

According to various approaches, the geometry of the data storage system (e.g., track width, reader width, etc.), may contribute in determining the allowable distribution during writing for various embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be clear that the various features of the foregoing methodologies may be combined in any way, creating a plurality of combinations from the descriptions presented above.

It will also be clear to one skilled in the art that the methodology of the present invention may suitably be embodied in a logic apparatus comprising logic to perform various steps of the methodology presented herein, and that such logic may comprise hardware components or firmware components.

It will be equally clear to one skilled in the art that the logic arrangement in various approaches may suitably be embodied in a logic apparatus comprising logic to perform various steps of the method, and that such logic may comprise components such as logic gates in, for example, a programmable logic array. Such a logic arrangement may further be embodied in enabling means or components for temporarily or permanently establishing logical structures in such an array using, for example, a virtual hardware descriptor language, which may be stored using fixed or transmittable carrier media.

It will be appreciated that the methodology described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

Embodiments of the present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Communications components such as input/output or I/O devices (including but not limited to keyboards, displays, pointing devices, etc.) can be coupled to the system either directly or through intervening I/O controllers.

Communications components such as buses, interfaces, network adapters, etc. may also be coupled to the system to enable the data processing system, e.g., host, to become coupled to other data processing systems or remote printers or storage devices through intervening private or public networks. Modems, cable modem and Ethernet cards are just a few of the currently available types of network adapters.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:
1. A system, comprising:
a controller; and
logic encoded in and/or available to the controller, the logic being configured to:

determine a stopwrite threshold based on a standard deviation or a variance at a current position error signal sample;

determine whether the current position error signal sample exceeds the stopwrite threshold;

disable writing in response to determining that the current position error signal sample exceeds the stopwrite threshold; and enable writing in response to determining that the current position error signal sample does not exceed the stopwrite threshold.

2. A system as recited in claim 1, wherein a smoothing factor applied to a subsequent calculation of the standard deviation or variance is altered based at least in part on a current magnitude of the standard deviation or the variance, wherein the logic for periodically determining the stopwrite threshold includes:

logic encoded in or available to the controller for updating the standard deviation or the variance based on position error signal samples and the altered smoothing factor;

logic encoded in or available to the controller for determining whether the standard deviation or the variance exceeds a predetermined threshold; and logic encoded in or available to the controller for determining the stopwrite threshold based on the standard deviation or the variance when the standard deviation or the variance exceeds the predetermined threshold.

3. A system as recited in claim 2, comprising:

logic encoded in or available to the controller for comparing the current position error signal to a second value calculated using the standard deviation or the variance when the standard deviation or the variance does not exceed the predetermined threshold;

logic encoded in or available to the controller for disabling writing when the current position error signal sample exceeds the second value; and logic encoded in or available to the controller for enabling writing when the current position error signal sample does not exceed the second value.

4. A system as recited in claim 2, comprising logic encoded in or available to the controller for updating a truncated value using a current position error signal value when writing is enabled, wherein the truncated value is not updated when writing is disabled; and logic encoded in or available to the controller for comparing the truncated value to the predetermined threshold.

5. A system as recited in claim 2, wherein the stopwrite threshold is determined by selecting a stopwrite value preassociated with the standard deviation or the variance.

6. A system as recited in claim 1, wherein a smoothing factor applied to a subsequent calculation of the standard deviation or variance is altered based at least in part on a current magnitude of the standard deviation or the variance, wherein the smoothing factor is altered to slow a change in the standard deviation or the variance in the subsequent calculation thereof when the standard deviation or the variance at the current position error signal sample is below a specified value.

7. A system as recited in claim 1, wherein a smoothing factor applied to a subsequent calculation of the standard deviation or variance is altered based at least in part on a current magnitude of the standard deviation or the variance, wherein the smoothing factor is altered to accelerate a change in the standard deviation or the variance in the subsequent calculation thereof when the standard deviation or the variance at the current position error signal sample is above a specified value.

8. A system as recited in claim 1, wherein a smoothing factor applied to a subsequent calculation of the standard deviation or variance is altered based at least in part on a current magnitude of the standard deviation or the variance, wherein the smoothing factor is altered after each calculation of the standard deviation or the variance.

9. A system as recited in claim 1, wherein the logic is executed at intervals of less than 1 millisecond.

10. A system as recited in claim 1, comprising a magnetic head electrically coupled to the controller.

11. A method, comprising:

determining a stopwrite threshold based on a standard deviation or a variance at a current position error signal sample;

determining whether the current position error signal sample exceeds the stopwrite threshold;

disabling writing in response to determining that the current position error signal sample exceeds the stopwrite threshold; and enabling writing in response to determining that the current position error signal sample does not exceed the stopwrite threshold.

12. A method as recited in claim 11, wherein a smoothing factor applied to a subsequent calculation of the standard deviation or variance is altered based at least in part on a current magnitude of the standard deviation or the variance, wherein the determining the stopwrite threshold includes:

updating the standard deviation or the variance based on the current position error signal sample and the altered smoothing factor;

determining whether the standard deviation or the variance exceeds a predetermined threshold; and determining the stopwrite threshold based on the standard deviation or the variance when the standard deviation or the variance exceeds the predetermined threshold.

13. A method as recited in claim 11, comprising:

comparing the current position error signal to a second value calculated using the standard deviation or the variance when the standard deviation or the variance does not exceed a predetermined threshold;

disabling writing when the current position error signal sample exceeds the second value; and enabling writing when the current position error signal sample does not exceed the second value.

14. A method as recited in claim 11, comprising updating a truncated value using a current position error signal value when writing is enabled, wherein the truncated value is not updated when writing is disabled; and comparing the truncated value to a predetermined threshold.

15. A method as recited in claim 11, wherein the stopwrite threshold is determined by selecting a stopwrite value preassociated with the standard deviation or the variance.

16. A method as recited in claim 11, wherein the method is executed at intervals of less than 1 millisecond.

17. A method as recited in claim 11, wherein a smoothing factor applied to a subsequent calculation of the standard deviation or variance is altered based at least in part on a current magnitude of the standard deviation or the variance, wherein the smoothing factor is altered to slow a change in the standard deviation or the variance in the subsequent calculation thereof when the standard deviation or the variance at the current position error signal sample is below a specified value.

18. A method as recited in claim 11, wherein a smoothing factor applied to a subsequent calculation of the standard deviation or variance is altered based at least in part on a current magnitude of the standard deviation or the variance, wherein the smoothing factor is altered to accelerate a change in the standard deviation or the variance in the subsequent calculation thereof when the standard deviation or the variance at the current position error signal sample is above a specified value.

19. A method as recited in claim 11, wherein a smoothing factor applied to a subsequent calculation of the standard deviation or variance is altered based at least in part on a current magnitude of the standard deviation or the variance, wherein the smoothing factor is altered after each calculation of the standard deviation or the variance.

20. A computer program product, the computer program product comprising a computer readable storage medium having program instructions embodied therewith, the computer readable program code executable by a controller to cause the controller to:
  determine, by the controller, a stopwrite threshold based on a standard deviation or a variance at a current position error signal sample;
  determine, by the controller, whether the current position error signal sample exceeds the stopwrite threshold;
  disable, by the controller, writing in response to determining that the current position error signal sample exceeds the stopwrite threshold; and
  enable, by the controller, writing in response to determining that the current position error signal sample does not exceed the stopwrite threshold.

* * * * *